United States Patent
Finkelstein et al.

(10) Patent No.: US 9,641,876 B2
(45) Date of Patent: May 2, 2017

(54) SYSTEMS AND METHODS FOR COMBINING VARIABLE BIT RATE DATA STREAMS

(75) Inventors: Jeffrey L. Finkelstein, Alpharetta, GA (US); Sung-eun Kim, Marietta, GA (US); Benny K. Bing, Atlanta, GA (US)

(73) Assignee: Cox Communications, Inc., Atlanta, GA (US)

(*) Notice: Subject to any disclaimer, the term of this patent is extended or adjusted under 35 U.S.C. 154(b) by 603 days.

(21) Appl. No.: 13/170,576

(22) Filed: Jun. 28, 2011

(65) Prior Publication Data

US 2013/0003800 A1 Jan. 3, 2013

(51) Int. Cl.
*H04N 21/2365* (2011.01)
*H04N 21/234* (2011.01)

(52) U.S. Cl.
CPC . *H04N 21/23655* (2013.01); *H04N 21/23418* (2013.01)

(58) Field of Classification Search
CPC .................. H04N 21/23418; H04N 21/23655
USPC .................................................. 370/352, 252
See application file for complete search history.

(56) References Cited

U.S. PATENT DOCUMENTS

| | | | | |
|---|---|---|---|---|
| 2002/0036856 A1* | 3/2002 | Korst et al. | | 360/55 |
| 2005/0267948 A1* | 12/2005 | McKinley | | H04N 7/17336 709/217 |
| 2006/0088092 A1* | 4/2006 | Chen | | G08B 13/19656 375/240.01 |
| 2008/0107173 A1* | 5/2008 | van Beek | | H04N 21/23406 375/240.02 |
| 2008/0219176 A1* | 9/2008 | Yamada | | 370/252 |
| 2008/0320156 A1* | 12/2008 | Chen | | H04W 76/02 709/230 |
| 2009/0028192 A1* | 1/2009 | Rieger | | H04H 20/42 370/535 |
| 2009/0089445 A1* | 4/2009 | Deshpande | | G06F 15/16 709/231 |
| 2009/0097554 A1* | 4/2009 | Savoor et al. | | 375/240.08 |
| 2010/0238924 A1* | 9/2010 | Liu | | G06Q 10/087 370/390 |
| 2011/0145879 A1* | 6/2011 | Rajamani | | G06F 3/1454 725/116 |
| 2012/0054344 A1* | 3/2012 | Udani | | H04L 12/5695 709/226 |
| 2012/0179742 A1* | 7/2012 | Acharya | | H04N 7/18 709/202 |

* cited by examiner

*Primary Examiner* — Khaled Kassim
(74) *Attorney, Agent, or Firm* — Eversheds Sutherland (US) LLP

(57) ABSTRACT

Systems and methods for combining variable bit rate data streams are provided. A plurality of data streams may be identified by a service provider system that includes one or more computers. Each data stream may be a variable bit rate data stream. Based upon an analysis of the respective variable bit rates, the service provider system may determine a subset of the plurality of data streams to be combined. The subset of data streams may then be combined and output by the service provider system for transmission to one or more consumer devices.

17 Claims, 5 Drawing Sheets

SYSTEMS AND METHODS FOR COMBINING VARIABLE BIT RATE DATA STREAMS

FIELD OF THE INVENTION

Aspects of the invention relate generally to the transmission of data streams, and more particularly, to the transmission of variable bit rate data streams.

BACKGROUND OF THE INVENTION

It is common for a head end system or server, such as a cable provider system, a satellite provider system, or an Internet provider system, to process multiple data streams. For example, a wide variety of head end systems process and transmit multiple video streams. In conventional systems, such as conventional cable systems, one or more data streams are typically grouped or combined together within a given channel, such as a quadrature amplitude modulation ("QAM") channel. Each QAM channel typically includes a given bandwidth, such as a bandwidth of six megahertz (6 MHz). A certain number of data streams, such as three high definition data streams utilizing MPEG-2 compression, are typically included in the QAM channel.

However, the combination of data streams within a given channel often leads to the capping of data that is transmitted. For example, each of the three data streams included in the QAM channel discussed above may be capped or limited to one-third of the bandwidth for the channel. This capping often leads to the loss or deletion of data from one or more data streams. For example, during a portion of a video data stream that includes a relatively large amount of data (e.g., a scene change, an action scene, etc.), a portion of the data will be cut as a result of the capping. As a result, recipients of the data stream will only receive a portion of the available data. Accordingly, improved systems and methods for combining data streams are desirable.

BRIEF DESCRIPTION OF THE INVENTION

Some or all of the above needs and/or problems may be addressed by certain embodiments of the invention. Embodiments of the invention may include systems and methods for combining data streams. In one embodiment, a method for combining data streams may be provided. A plurality of data streams may be identified by a service provider system that includes one or more computers. Each data stream may be a variable bit rate data stream. Based upon an analysis of the respective variable bit rates, the service provider system may determine a subset of the plurality of data streams to be combined. The subset of data streams may then be combined and output by the service provider system for transmission to one or more consumer devices.

In accordance with another embodiment of the invention, a system for combining data streams may be provided. The system may include at least one memory and at least one processor. The at least one memory may be configured to store computer-executable instructions. The at least one processor may be configured to access the at least one memory and execute the computer-executable instructions to: identify a plurality of variable bit rate data streams; determine, based upon an analysis of the variable bit rates associated with the data streams, a subset of the data streams to be combined; direct the combination of the subset of data streams; and direct the transmission of the combined subset of data streams to one or more consumer devices.

In accordance with yet another embodiment of the invention, a method for combining data streams may be provided. A variable bit rate data stream may be identified by a service provider system that includes one or more computers. A threshold bandwidth for the data stream may be calculated by the service provider system. Based at least in part on the calculated threshold bandwidth, the service provider system may determine whether the data stream should be added to a combined group of data streams.

Additional systems, methods, apparatus, features, and aspects may be realized through the techniques of various embodiments of the invention. Other embodiments and aspects of the invention are described in detail herein with reference to the description and to the drawings and are considered a part of the claimed invention.

BRIEF DESCRIPTION OF THE DRAWINGS

Reference will now be made to the accompanying drawings, which are not necessarily drawn to scale, and wherein.

DETAILED DESCRIPTION

Figure 1:
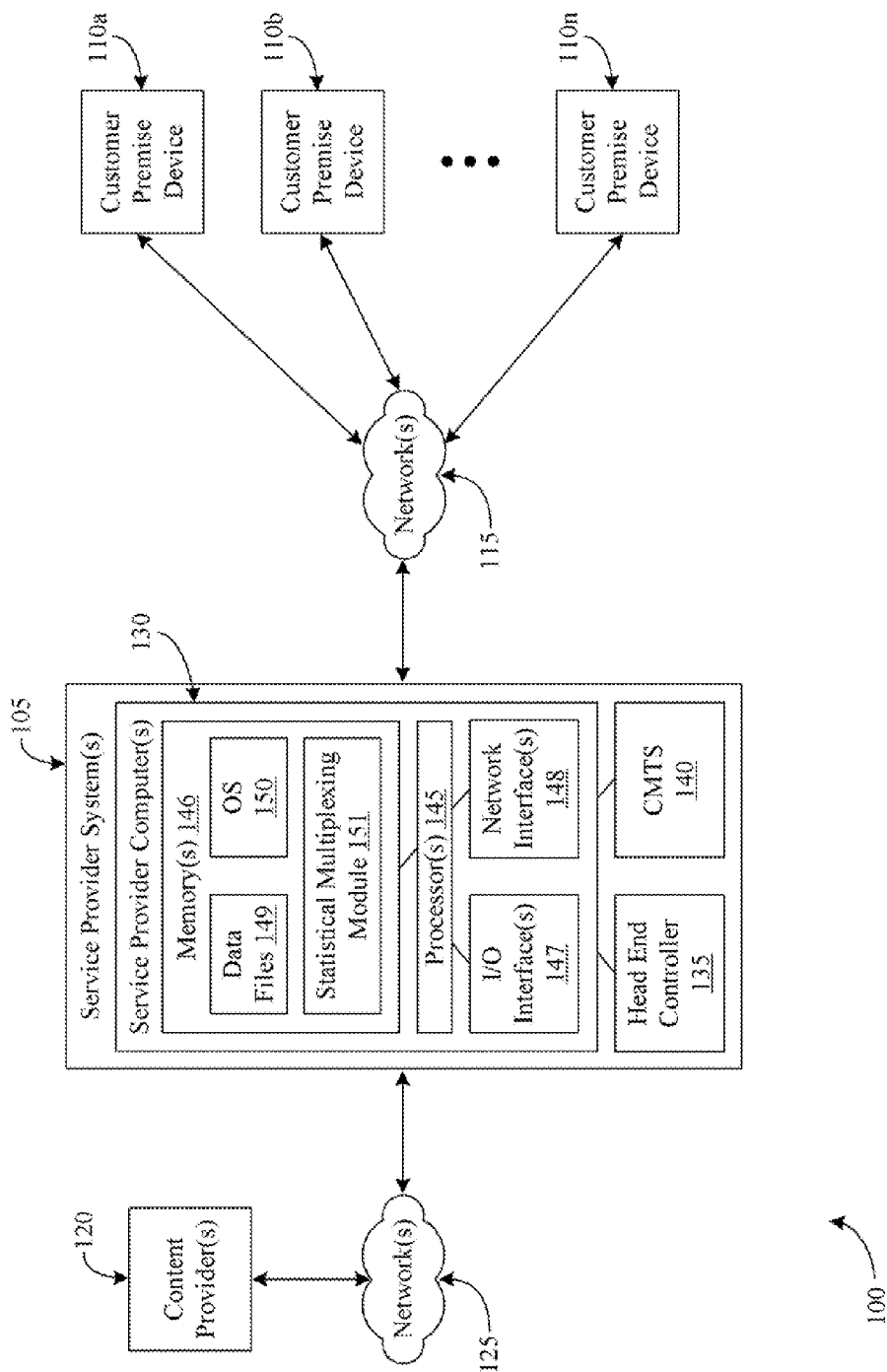
FIG. 1 illustrates a block diagram of an example system that may be utilized to combine or multiplex data streams, according to an illustrative embodiment of the invention.

Embodiments of the invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the invention may include systems and methods for combining a plurality of data streams within a given bandwidth, such as a bandwidth associated with one or more bonded Digital Over Cable Service Internet Specification ("DOCSIS") channels. In certain embodiments, the data streams may be variable bit rate data streams that are statistically multiplexed together. The data streams may include any suitable type of data as desired in various embodiments of the invention, including but not limited to, video data, audio data, and/or other types of data. Additionally, as desired, one or more of the data streams may be compressed. As one example, a plurality of variable bit rate compressed video streams may be combined together within an available bandwidth. In this regard, the inherent variations in the instantaneous bit rates associated with the data streams may be exploited in order to increase the number of data streams that may be combined within an available bandwidth. Additionally, the picture quality of the data streams may be maintained at a relatively constant level. For example, if a first data stream is demanding a relatively high instantaneous bit rate, it is likely that other data streams have capacity to share. Accordingly, a relatively large number of data streams may be efficiently combined.

In certain embodiments, data streams having different resolutions may be combined. For example, the video resolutions of various data streams may affect the frame size distributions and, therefore, the data rates of the data streams. The video resolutions may affect, for example, the rates of scene changes and/or the peak of frame sizes. As a result of mixing or combining data streams having different resolutions, the likelihood of peaks or spikes occurring concurrently may be reduced. In this regard, a number of data streams that may be efficiently combined within an available bandwidth may be increased.

Additionally, in certain embodiments, one or more shaping algorithms may be utilized in order to manage rate variations for the combined videos, such as instantaneous rate variations. Compressed data streams may exhibit a long-range dependent traffic characteristic, causing the data traffic to tend to cluster. As a result, the overall bandwidth requirements of the data streams may become less predictable as the number of combined data streams increases. There is a correlation between various encoding parameters, such as the quantization parameter, and the long-range dependency. Data streams having relatively low quantization values (i.e., higher quality) may tend to exhibit relatively greater long-range dependency. In certain embodiments, when data streams exhibit relatively low quantization values, data streams having different resolutions may be combined in order to spread the peaks of the data streams and more efficiently utilize the available bandwidth. Data streams having a higher quantization value may exhibit relatively less long-range dependency. Accordingly, mixing or combining data streams may result in a more efficient use of an available bandwidth.

In either case (i.e., data streams having relatively high and relatively low quantization values), a suitable shaping algorithm may be utilized to manage rate variations. One example of a suitable shaping algorithm is set forth in equation one (1) below:

$$\text{ShapingThreshold} = \text{AverageBitRate} + n(\text{StandardDeviation}) \quad (1)$$

With reference to equation one, a calculated shaping threshold may provide a bandwidth threshold for any number of data streams. The shaping threshold may be calculated as a function of the average bit rate(s) and the standard deviation of the bit rate(s) of any number of data streams. The variable "n" may be a value between zero (0) and one (1) that provides a weighting factor for a desired delay associated with the combined data streams. A value of "n" that is equal to one implies no shaping will be performed, thereby allowing the bit rate(s) to vary according to their natural rate(s). A value of "n" that is equal to zero implies aggressive shaping that may be suitable for various two-way network protocols (e.g., hypertext transfer protocol, etc.) that allow buffer resources at a server and/or receiver to be controlled dynamically. A wide variety of weighting factors may be utilized as desired in various embodiments of the invention. For example, a weighting factor of approximately 0.5 may be utilized to provide a maximum delay of approximately one hundred milliseconds (100 ms). In certain embodiments, a bandwidth threshold may be calculated for a predetermined time period, such as a time period or time window of approximately ten seconds (10 s). In other embodiments, a bandwidth threshold may be dynamically calculated in real time or near real time. In this regard, the bandwidth threshold may be periodically or dynamically adjusted during the communication or transmission of data streams.

In one example embodiment, a plurality of variable bit rate data streams may be identified. Based upon an analysis of the variable bit rates associated with each of the data streams, a determination may be made as to which data streams may be combined within a given bandwidth, such as a bandwidth associated with a plurality of bonded channels (e.g., a plurality of DOCSIS bonded channels). For example, a subset of the data streams may be identified for combining within the available bandwidth. A wide variety of suitable techniques may be utilized to identify the subset of data streams. For example, a respective threshold bandwidth may be calculated for each of the data streams utilizing a suitable shaping algorithm, such as the shaping algorithm illustrated in equation one (1) above. The subset of data streams may then be identified based at least in part upon the calculated threshold bandwidths. In certain embodiments, the subset of data streams may be identified for a predetermined time period or time window, such as a time period of approximately ten seconds (10 s). Additionally, in certain embodiments, data streams having similar resolutions and/or data streams having different resolutions may be identified for combining or mixing.

Once a group or subset of data streams has been combined (e.g., multiplexed together within a given bandwidth), the group of data streams may be transmitted or otherwise output for communication to one or more customers. For example, a service provider (e.g., a cable service provider, a satellite service provider, etc.) may output the combined data streams for transmission to one or more customer devices, such as customer set-top boxes and/or broadband modems.

System Overview

An example system 100 for combining and/or multiplexing a plurality of data streams will now be described illustratively with respect to FIG. 1. The system 100 may include, for example, one or more service provider systems 105 and/or any number of customer premise devices 110*a-n* or programming processing components. Any number of suitable service provider networks 115 (e.g., cable networks, satellite networks, etc.) may facilitate communications between the service provider systems 105 and the customer premise devices 110*a-n*. In certain embodiments, the service provider system 105 may receive data and/or data streams from any number of content providers 120 via one or more suitable networks 125. The service provider system 105 may process the received data, combine various data streams, and output the combined data streams for receipt by one or more customer premise devices 110*a-n*.

In certain embodiments, the service provider system 105 may include any number of suitable components or subsystems, such as one or more service provider computers 130, one or more head end controllers 135, and/or one or more cable modem termination systems ("CMTSs"). As desired, these various components may facilitate the processing and/or output of data streams. For example, a service provider computer 130 may determine or identify data streams that will be combined or multiplexed together within an available bandwidth. A head end controller 135 and/or CMTS 140 may then direct or facilitate the transmission or other output of the combined data streams. In certain embodiments, the service provider system 105 may output one or more broadband signals for receipt by the customer premise devices 110a-n. For example, the service provider system 105 may include systems associated with a cable service provider, a satellite service provider, an Internet service provider, or other service provider. In addition to having the described components, a suitable service provider system 105 may include any number of other components, such as a conditional access system controller, any number of encryption devices, an electronic program guide data server, an on-demand server, a pay-per-view purchase server, a billing system, a profile server, etc.

As desired, one or more components of the system 100 may be processor-driven components or devices. In this regard, certain components of the system 100 may be configured for accessing and reading associated computer-readable media having stored thereon data and/or computer-executable instructions for implementing the various methods of the invention. Additionally, in certain embodiments, certain components of the system 100 may be optional and/or combined. For example, a head end controller 135 and a CMTS 140 may be implemented as a single component.

With continued reference to FIG. 1, any number of service provider computers 130 may be associated with the service provider system 105. A service provider computer 130 may be a suitable processor-driven device configured to identify data streams to be combined or multiplexed together. For example, the service provider computer 130 may identify data streams to be combined together within a group of DOCSIS bonded channels. Examples of suitable processor-driven devices that may be utilized as a service provider computer 130 include, but are not limited to, a personal computer, a digital assistant, a personal digital assistant, a digital tablet, an Internet appliance, an application-specific circuit, a microcontroller, a minicomputer, or any other processor-based device. The execution of suitable computer-implemented instructions or computer-executable instructions by the service provider computer 130 may form a special purpose computer or other particular machine that is operable to facilitate the identification of data streams to be combined and/or the direction of the combination.

The service provider computer 130 may include one or more processors 145, one or more memory devices 146, one or more input/output ("I/O") interfaces 147, and/or one or more network interfaces 148. The processor(s) 145 may be configured to execute any number of software applications and/or computer-readable or computer-executable instructions. The memory devices 146 may include any number of suitable memory devices, such as caches, read-only memory devices, random access memory devices, magnetic storage devices, etc. The memory devices 146 may store data, executable instructions, and/or various program modules utilized by the processor(s) 145. Examples of data that may be stored by the memory devices 146 include data files 149 and/or any number of suitable program modules that may be executed by the processor(s) 145, such as an operating system ("OS") 150 and/or a statistical multiplexing module 151 or statistical multiplexing application.

The data files 149 may include any suitable data that facilitates the operation of the service provider computer 130 and/or the identification of data streams to be combined or multiplexed together. For example, the data files 149 may include, but are not limited to, information associated with one or more content providers 120, bandwidth and/or bit rate information associated with one or more variable bit rate data streams, buffered information associated with one or more data streams, information associated with one or more shaping algorithms, and/or preferences and/or parameters for identifying and combining data streams. The OS 150 may be a suitable software module that controls the general operation of the service provider computer 130. The OS 150 may also facilitate the execution of other software modules, for example, the statistical multiplexing module 151.

The statistical multiplexing module 151 may be a suitable software module or software application that is configured to identify data streams to be combined or multiplexed together. In operation, the statistical multiplexing module 151 may identify data streams for combination or multiplexing together within an available or given bandwidth. For example, the statistical multiplexing module 151 may identify a plurality of variable bit rate data streams, such as variable bit rate video data streams that are received from the content providers 120. The statistical multiplexing module 151 may additionally identify or determine an available bandwidth for combining data streams, such as an available bandwidth associated with a plurality of DOCSIS bonded channels. The statistical multiplexing module 151 may then determine which of the plurality of data streams may be combined together within the available bandwidth, and the statistical multiplexing module 151 may direct the combination or multiplexing of the determined data streams. Following the combination, the statistical multiplexing module 151 may direct the output of the combined data streams. For example, the data streams may be combined in a plurality of DOCSIS bonded channels, and the bonded channels may be output as a broadband signal or a portion of a broadband signal (e.g., a cable signal, a satellite signal, etc.) associated with the service provider.

A wide variety of suitable methods and/or techniques may be utilized by the statistical multiplexing module 151 in order to identify or determine data streams that will be combined. In this regard, the likely bandwidth requirements for the data streams may be evaluated, and a number of data streams that may be included in a given amount of bandwidth may be increased and/or maximized. In certain embodiments, one or more shaping algorithms may be utilized to determine data streams that may be combined. For example, a shaping algorithm, such as the algorithm set forth in equation one (1), may be utilized to calculate a threshold bandwidth for individual data streams and/or groups of data streams. Once a threshold bandwidth has been calculated, a determination may be made as to whether the data stream or group of data streams may be added to an available bandwidth (e.g., a group of bonded channels, etc.). For example, a determination may be made as to whether sufficient bandwidth is available to accommodate the bandwidth requirements of the data stream or group of data streams. If sufficient bandwidth is available, then the data stream or group of data streams may be added to the available bandwidth. If, however, sufficient bandwidth is not available, then the data stream or group of data streams may be added to another available bandwidth, such as another group of bonded channels.

In certain embodiments, data streams may be periodically analyzed in accordance with a given time window. For example, data streams may be analyzed every ten seconds (10 s) or in accordance with any other period of time. In this regard, the bandwidth shaping of the variable bit rate data streams may be periodically determined and adjusted. Accordingly, the combination of data streams may be periodically determined and adjusted in order to maximize the use of an available bandwidth.

The operations for the statistical multiplexing module 151 described above are provided by way of example only. A wide variety of other operations may be performed by the statistical multiplexing module 151 as desired in various embodiments of the invention. A few examples of the operations that may be performed by the statistical multiplexing module 151 are described in greater detail below with reference to FIGS. 2-3.

With continued reference to the statistical multiplexing module 151, the one or more I/O interfaces 147 may facilitate communication between the statistical multiplexing module 151 and one or more input/output devices, for example, one or more user interface devices, such as a display, keypad, mouse, pointing device, control panel, touch screen display, remote control, microphone, speaker, etc., that facilitate user interaction with the statistical multiplexing module 151. In this regard, user commands (e.g., programming commands, etc.) may be received by the statistical multiplexing module 151. The one or more network interfaces 148 may facilitate connection of the statistical multiplexing module 151 to any number of suitable networks, for example, one or more local area networks that facilitate communication with other components of the service provider system 105, one or more networks 125 that facilitate communication with the content providers 120, and/or one or more service provider networks 115 or broadband networks (e.g., a cable network, a satellite network, etc.) that facilitate communication with any number of customer premise devices 110*a-n*. In this regard, the statistical multiplexing module 151 may communicate with other components of the system 100.

With continued reference to the service provider system 105, the head end controller 135 may direct the transmission, broadcast, or other output of one or more broadband signals, such as a broadband signal that includes combined data streams. Similarly, the CMTS 140 may be a suitable system or component that facilitates the transmission of one or more broadband signals to the customer premise devices 110*a-n* via the networks 115. Indeed, a wide variety of suitable systems and/or devices may be utilized by the service provider system 105 to facilitate the transmission of data streams.

With continued reference to FIG. 1, any number of customer premise devices 110*a-n* may be provided. Each customer premise device 110 may be a suitable device or component, such as a suitable processor-driven device, that facilitates the receipt and/or processing of broadband signals and/or combined data streams, such as a broadband cable signal or a broadband satellite signal. In certain embodiments, the customer premise device 110 may be a device or component that is situated within a customer's household or other structure associated with the customer. The customer premise device 110 may include suitable hardware and/or software components capable of receiving and processing a broadband signal (e.g., a cable signal, a satellite signal, etc.) output by a service provider system 105. Examples of a suitable customer premise device 110 include, but are not limited to, a set-top box ("STB") (e.g., a cable STB, a digital satellite STB, an Internet Protocol Television STB, etc.), a virtual STB, an embedded STB, etc.

In certain embodiments, the customer premise devices 110 may be connected to one or more display devices, such as a television, associated with a customer. In other embodiments, the customer premise devices 110 may be embedded, incorporated into, and/or executed on a display device. In operation, the customer premise devices 110 may receive at least a portion of a broadband data signal output by the service provider system 105, and the customer premise devices 110 may convert at least a portion of the received signal into content which is displayed or otherwise output by the display device. As desired, the customer premise devices 110 may receive a broadband data signal via any number of suitable service provider networks 115, such as a cable network that includes any number of optical fibers, coaxial cables, and/or cable drops, a satellite network that includes a suitable satellite dish and/or connecting cables, and/or other suitable networks. Additionally, any number of intermediary devices, such as broadband modems, routers, etc., may be situated between the service provider system 105 and the customer premise devices 110.

With continued reference to FIG. 1, any number of content providers 120 may be provided. A content provider 120 may include any number of suitable systems and/or devices configured to output content for receipt by the service provider system 105. For example, a content provider 120 may include a system that facilitates the output of one or more variable bit rate data streams (e.g., television content, movies, etc.) that may be received and further processed by the service provider system 105. The service provider system 105 may receive content from one or more content providers 120, and the service provider system 105 may process the received content in order to identify data streams that may be combined.

Communications between various components of the system 100 may be facilitated via any number of suitable networks, such as one or more service provider networks 115 (e.g., a cable network, a satellite network, etc.) and/or other networks 125. The various networks may include any telecommunication and/or data networks, whether public, private, or a combination thereof, including but not limited to, a local area network, a wide area network, an intranet, the Internet, public switched telephone networks, satellite networks, cable networks, and/or any combination thereof and may be wired and/or wireless.

Those of ordinary skill in the art will appreciate that the system 100 shown in and described with respect to FIG. 1 is provided by way of example only. Numerous other operating environments, system architectures, and device configurations are possible. Other system embodiments can include fewer or greater numbers of components and may incorporate some or all of the functionality described with respect to the system components shown in FIG. 1.

Operational Overview

Figure 2:
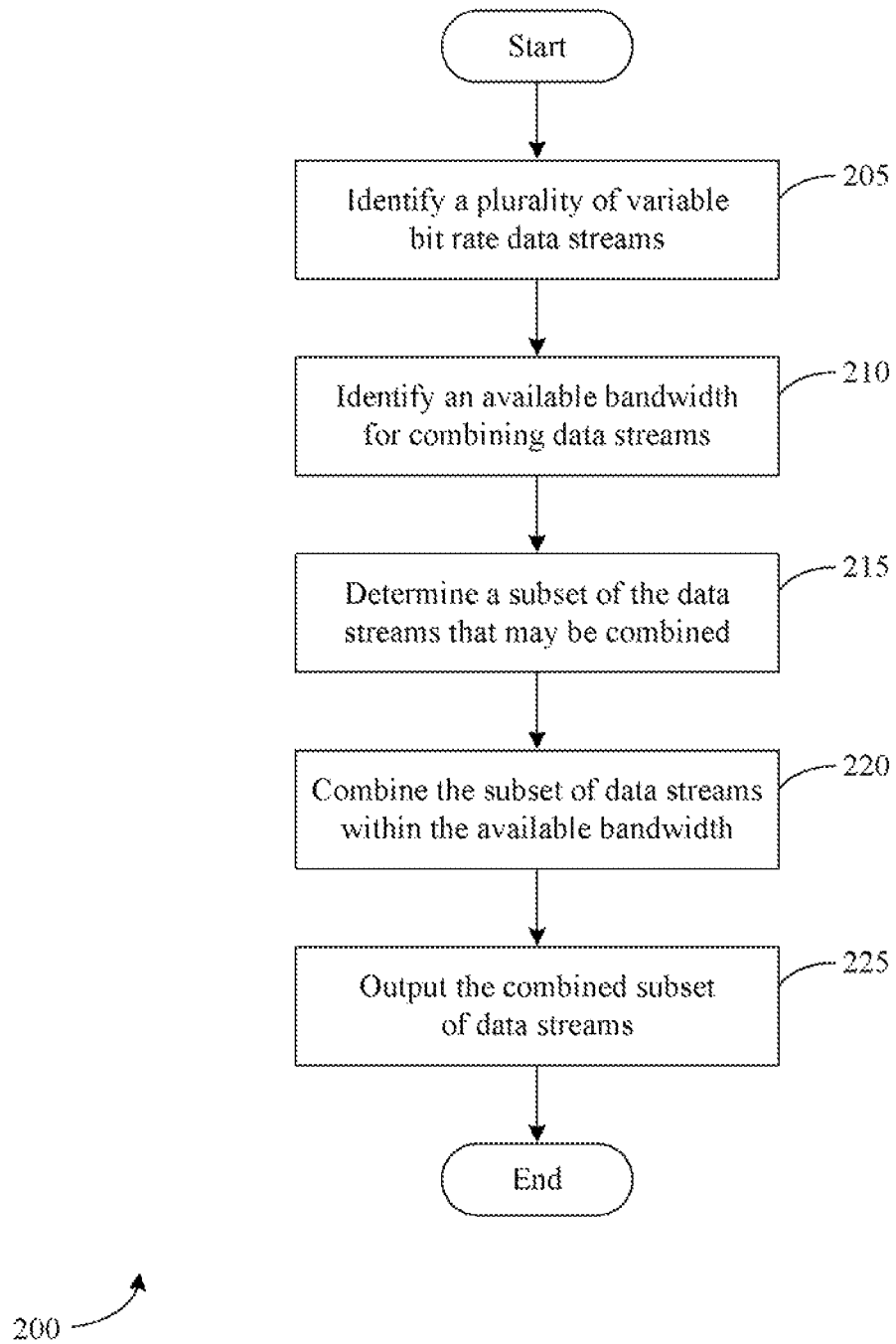
FIG. 2 is a flow diagram of an example method for combining a plurality of data streams, according to an example embodiment of the invention.

FIG. 2 is a flow diagram of an example method 200 for combining a plurality of data streams, according to an example embodiment of the invention. In certain embodiments, the method 200 may be performed by a suitable service provider system and/or statistical multiplexing module, such as the service provider system 105 and/or the statistical multiplexing module 151 illustrated in FIG. 1. The method 200 may begin at block 205.

At block 205, a plurality of data streams, such as a plurality of variable bit rate data streams, may be identified. For example, a plurality of data streams may be received from one or more content providers, such as the content providers 120 illustrated in FIG. 1, and the received data streams may be identified for processing. As desired, a wide variety of information may be identified for each of the data streams, such as an identifier of the data stream, a resolution associated with the data stream, a frame size associated with the data stream, a type of compression utilized in association with the data stream (e.g., MPEG-2 compression, MPEG-4 compression, etc.), a quantization parameter or quantization value associated with the data stream, and/or bit rate information associated with the data stream (e.g., instantaneous bit rate information, average bit rate information, etc.). Additionally, in certain embodiments, at least a portion of the received data streams may be buffered or otherwise stored in order to facilitate further processing of the data streams.

At block 210, an available bandwidth for combining or multiplexing data streams may be identified or determined. As desired in various embodiments, a wide variety of different bandwidth sizes may be identified as an available bandwidth. In certain embodiments, the identified available bandwidth may be an available bandwidth associated with one or more bonded transmission channels. For example, the available bandwidth may be a bandwidth associated with a plurality of DOCSIS channels that have been bonded together. As one example, a single channel may have a bandwidth of approximately six megahertz (6 MHz). Accordingly, four bonded channels may have an available bandwidth of approximately twenty-four megahertz (24 MHz). Any number of channels may be bonded together and, therefore, a wide variety of different available bandwidths may be identified.

At block 215, a subset of the plurality of data streams may be identified for combining or multiplexing together within the available bandwidth. A wide variety of suitable methods and/or techniques may be utilized in order to identify the subset of data streams to be combined. For example, in certain embodiments, bandwidth requirements and/or bandwidth parameters associated with the plurality of data streams may be evaluated, and the subset may be identified based at least in part upon the evaluation. As one example, a bandwidth threshold may be calculated for each of the data streams and/or for various groups of data streams. Any number of suitable shaping algorithms may be utilized as desired to calculate a bandwidth threshold, such as the shaping algorithm set forth in equation one (1) above. For example, an average bit rate and a standard deviation for the bit rate associated with a data stream may be utilized to calculate a bandwidth threshold (e.g., a maximum allowable bandwidth) for the data stream. In this regard, bandwidth requirements for each of the data streams may be calculated, and a determination may be made as to which data streams may be combined or multiplexed together within the available bandwidth. One example of the operations that may be utilized to process each data stream is described in greater detail below with reference to FIG. 3.

In certain embodiments, bandwidth requirements and/or parameters may be analyzed for a predetermined period of time or time window. For example, bandwidth requirements may be periodically analyzed approximately every ten seconds (10 s). Any other time window may be utilized as desired. In this regard, the bandwidth shaping of the data streams may be dynamically adjusted over time. Additionally, the bandwidth shaping may take into account a time delay associated with outputting or transmitting the data streams. For example, a weighting factor utilized in association with bandwidth shaping may affect a time delay associated with the data streams. In this regard, available buffering resources may be taken into account.

Additionally, as desired, the quantization values and/or resolutions of the data streams may be evaluated and/or analyzed. In this regard, the subset of data streams may be identified based at least in part upon the quantization values and/or resolutions. The combining of data streams having different resolutions may lead to a relatively more efficient use of available bandwidth. In certain embodiments, for data streams having relatively low quantization values (i.e., relatively higher quality data streams), attempts may be made to combine data streams having different resolutions. For data streams having relatively high quantization values, the resolutions may be considered; however, a relatively efficient use of available bandwidth may be achieved even if data streams having similar resolutions are combined.

At block 220, the identified subset of data streams may be combined or multiplexed together within the available bandwidth. For example, each data stream may be assigned slots and/or frames within the available bandwidth for a predetermined time window (e.g., 10 s, etc.). As a result of the combination, a relatively efficient use of the available bandwidth may be achieved. For example, the inherent variations in the instantaneous bit rates of the data streams may be exploited in order to increase an amount of data that is ultimately transmitted to customers, thereby improving the customer experience. The combined subset of data streams may then be transmitted or otherwise output at block 225. In this regard, the data streams may be received by any number of suitable customer premise devices, such as the customer premise devices illustrated in FIG. 1.

The method 200 may end following block 225.

Figure 3:
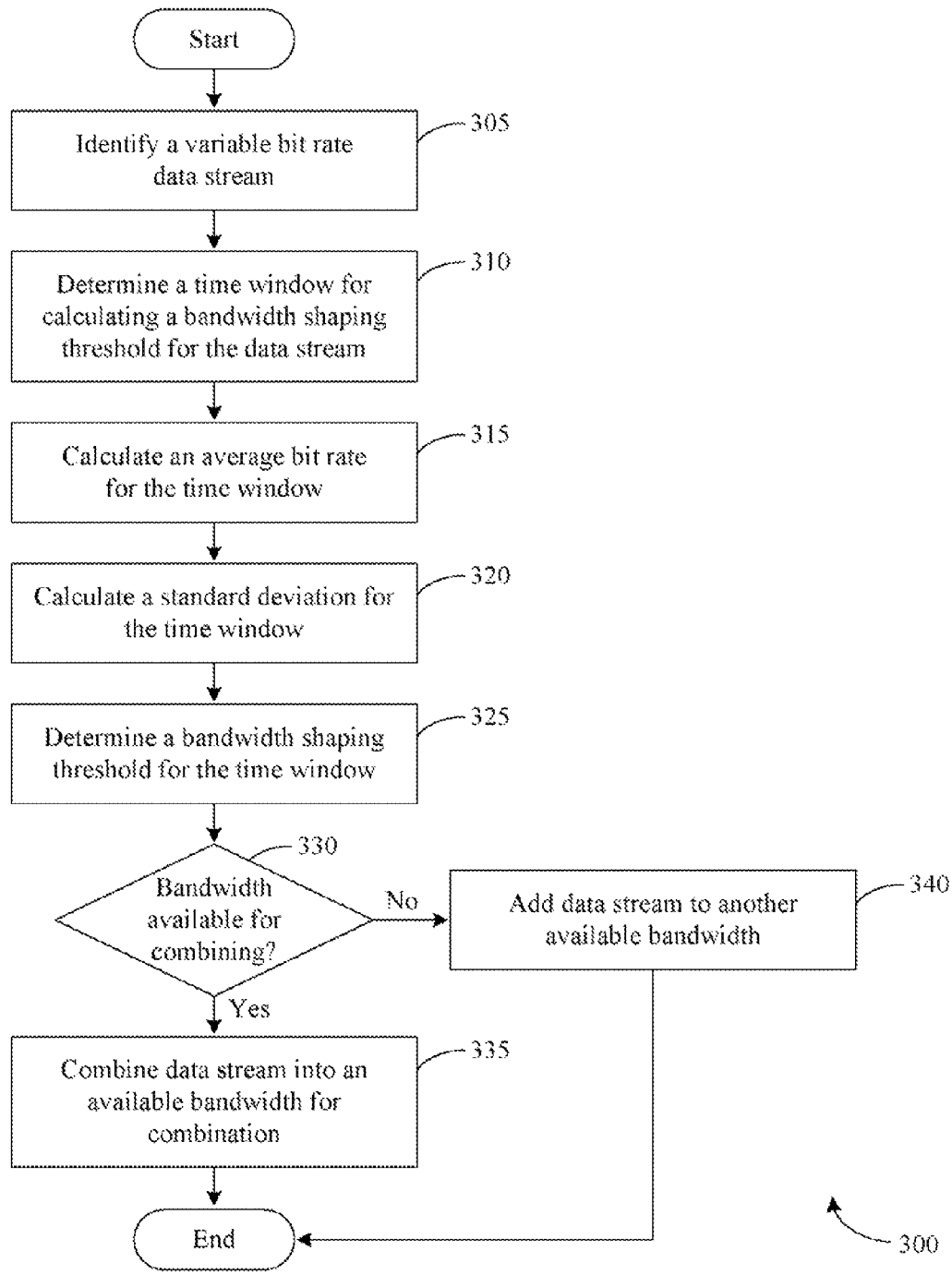
FIG. 3 is a flow diagram of an example method for determining whether a data stream should be added or combined with other data streams, according to an example embodiment of the invention.

FIG. 3 is a flow diagram of an example method 300 for determining whether a data stream should be added or combined with other data streams, according to an example embodiment of the invention. In certain embodiments, the operations of the method 300 may be performed by a suitable service provider system and/or statistical multiplexing module, such as the service provider system 105 and/or the statistical multiplexing module 151 illustrated in FIG. 1. The method 300 may begin at block 305.

At block 305, a data stream, such as a variable bit rate data stream, may be identified. As desired, a wide variety of information associated with the data stream may be identified, such as an identifier of the data stream, a resolution associated with the data stream, a frame size associated with the data stream, a type of compression utilized in association with the data stream (e.g., MPEG-2 compression, MPEG-4 compression, etc.), a quantization parameter or quantization value associated with the data stream, and/or bit rate information associated with the data stream (e.g., instantaneous bit rate information, average bit rate information, etc.). Additionally, in certain embodiments, at least a portion of the received data stream may be buffered or otherwise stored in order to facilitate further processing of the data stream.

At block 310, a time window for calculating a bandwidth shaping threshold for the data stream may be determined or identified. A wide variety of time windows or time periods may be utilized as desired to calculate a bandwidth shaping threshold. In this regard, bandwidth requirements for the data stream may be periodically and/or dynamically adjusted over time. One example of a suitable time window is a time window of approximately ten seconds (10 s), although other time windows may be utilized as desired.

At block 315, an average bit rate for the data stream may be calculated for the time window. For example, the instantaneous bit rates for the variable bit rate data stream over the time window may be identified, and an average bit rate may be calculated for the data stream. Any number of measurements and/or samples may be analyzed over the time window in order to calculate an average bit rate. For example, the instantaneous bit rate may be determined once a second, and the average bit rate may be calculated from the various instantaneous bit rates.

At block 320, a standard deviation of the variable bit rate of the data stream may be calculated for the time window. The standard deviation may measure the variability or diversity of the variable bit rate over the time window. Similar to the calculation for the average bit rate, any number of measurements and/or samples may be analyzed in order to calculate the standard deviation.

At block 325, a bandwidth shaping threshold for the data stream may be calculated or determined. The shaping threshold may establish a maximum allowable bandwidth for the data stream within the time window. Although the threshold may not permit all of the data included in the variable data stream to be transmitted downstream, the threshold will typically permit a higher amount of data than that allowed by traditional fixed bandwidth methods. Accordingly, a customer experience may be enhanced as a relatively greater amount of data may be communicated downstream. In certain embodiments, the shaping threshold may be calculated utilizing the average bit rate and the standard deviation. For example, a suitable shaping algorithm, such as the shaping algorithm set forth in equation one (1) above, may be utilized to calculate a shaping threshold for the data stream. Additionally, a weighting value associated with the shaping algorithm may be established based at least in part upon a desired delay associated with transmitting the data stream. In this regard, available buffer resources may be taken into consideration. In one example embodiment utilizing equation one (1), the weighting value may be set to approximately 0.5. This weighting value may lead to adequate shaping of the data stream with a delay that rarely exceeds approximately one hundred milliseconds (100 ms).

At block 330, a determination may be made as to whether sufficient bandwidth is available for combining the data stream with other data streams within the available bandwidth. In other words, a determination may be made as to whether adequate bandwidth resources are available for the time window to add the data stream to the available bandwidth. If it is determined at block 330 that sufficient bandwidth is available, then operations may continue at block 335, and the data stream may be combined or multiplexed into the available bandwidth. If, however, it is determined at block 330 that sufficient bandwidth is not available, then operations may continue at block 340. At block 340, which may be optional in certain embodiments of the invention, the data stream may be added to another available bandwidth. For example, the data stream may be added to another available group of DOCSIS bonded channels.

The method 300 may end following either block 335 or block 340.

The operations described and shown in the methods 200 and 300 of FIGS. 2-3 may be carried out or performed in any suitable order as desired in various embodiments of the invention. Additionally, in certain embodiments, at least a portion of the operations may be carried out in parallel. Furthermore, in certain embodiments, less than or more than the operations described in FIGS. 2-3 may be performed.

Figure 4:
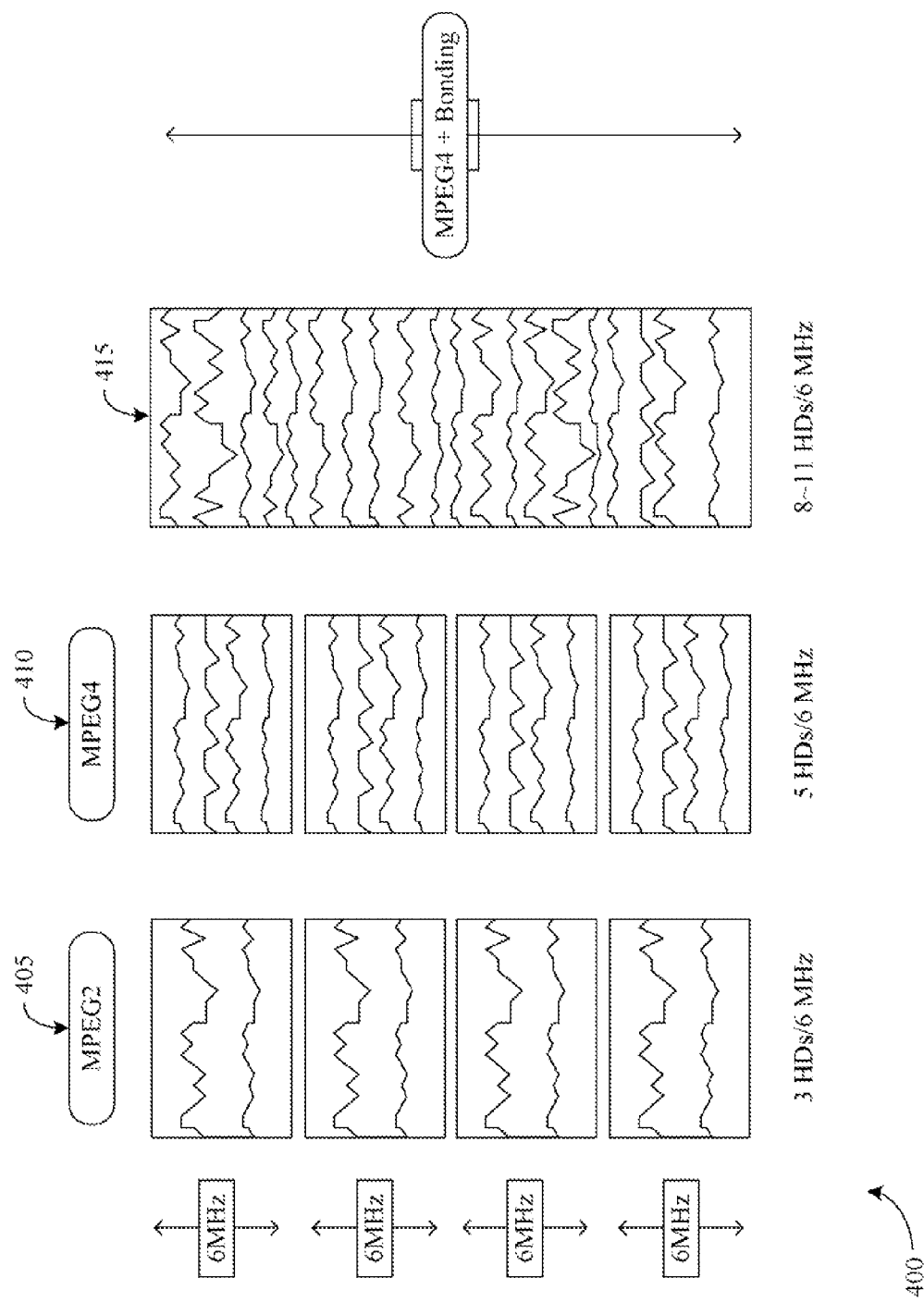
FIG. 4 is a chart illustrating example bandwidth improvements that may be achieved in accordance with various embodiments of the invention.

According to an aspect of the invention, combining or multiplexing data streams within an available bandwidth, such as bonded DOCSIS channels, may increase a number of data streams and/or an amount of data that may be transmitted or communicated from a service provider to its customers. FIG. 4 is a chart 400 illustrating example bandwidth improvements that may be achieved in accordance with various embodiments of the invention.

With reference to FIG. 4, a first column 405 illustrates several channels, such as quadrature amplitude multiplexing ("QAM") channels or DOCSIS channels. Each channel may be capable of transmitting a given amount of data. For example, each channel may have a bandwidth of approximately six megahertz (6 MHz). Within the bandwidth of each channel, it is typically possible to transmit three high definition ("HD") data streams that are compressed utilizing an MPEG-2 methodology. Similarly, the second column 410 illustrates several channels that are each utilized to transmit HD streams compressed utilizing an MPEG-4 methodology. As shown in the second column 410, the number of data streams that may be transmitted in each channel may be increased by utilizing a different compression technology. For example, five HD data streams may be transmitted in each channel.

However, with reference to the third column 415, the number of data streams may be increased further by utilizing channels that have been bonded together. For example, given four DOCSIS channels that have been bonded together such that the total available bandwidth for the channels is utilized, approximately eight to eleven HD data streams compressed utilizing an MPEG-4 methodology may be transmitted in the bandwidth typically available for one channel (e.g., approximately 6 MHz). Accordingly, bandwidth improvements may be achieved as a result of bonding channels together.

Figure 5:
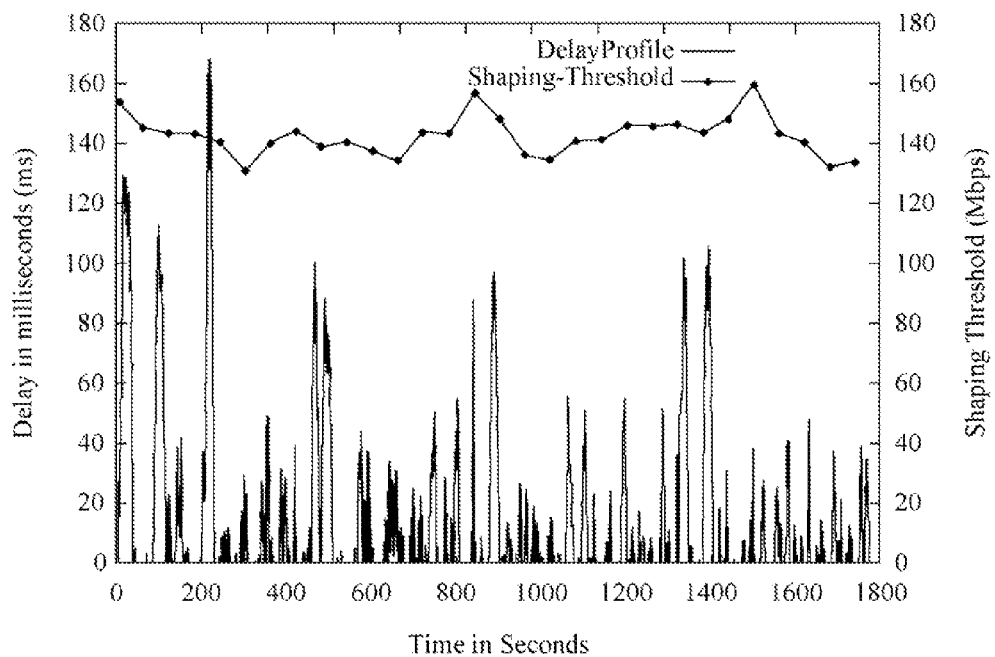
FIG. 5, is a diagram illustrating example delay and shaping thresholds associated with combined channels, according to an illustrative embodiment of the invention.

As stated above, a wide variety of shaping thresholds may be utilized in order to determine a number of data streams that may be combined within an available bandwidth. The shaping algorithm that is utilized may affect the number of data streams and/or the transmission delay associated with the combined data streams. FIG. 5 is a diagram 500 illustrating example delay and shaping thresholds associated with combined channels, according to an illustrative embodiment of the invention.

With reference to FIG. 5, an example shaping threshold and transmission delay are illustrated for a group of seventeen (17) data streams that have been combined or multiplexed together within an available bandwidth. Each of the data streams has a length of approximately thirty (30) minutes or eighteen hundred (1800) seconds. A time window of approximately sixty (60) seconds was utilized for calculating average bit rates, standard deviations, and a shaping threshold for the group of channels. Additionally, a weighting factor ("n") of 0.5 was utilized for calculating the various shaping thresholds.

As shown in FIG. 5, an amount of data included in the seventeen (17) data streams may vary over time. Accordingly, the shaping threshold for the data streams may vary over time. For example, a different shaping threshold may be utilized for each time interval. Additionally, the delay for transmitting the combined data streams may vary over time. The shaping may prevent the overall data rate from varying according to its natural rate. Additionally, the weighting factor ("n") may affect the transmission delay associated with the data streams. As shown, utilizing a weighting factor of 0.5, the delay associated with the data streams may typically be maintained at less than one hundred (100) milliseconds. Accordingly, adequate transmission speeds may be maintained for the combined variable bit rate data streams.

The diagram 500 illustrated in FIG. 5 is provided by way of example only. Indeed, any number of data streams may be combined as desired in various embodiments of the invention. Additionally, any number of weighting factors and/or time windows or time intervals may be utilized as desired in various embodiments.

Various block and/or flow diagrams of systems, methods, apparatus, and/or computer program products according to example embodiments of the invention are described above. It will be understood that one or more blocks of the block diagrams and flow diagrams, and combinations of blocks in the block diagrams and flow diagrams, respectively, can be implemented by computer-executable program instructions.

Likewise, some blocks of the block diagrams and flow diagrams may not necessarily need to be performed in the order presented, or may not necessarily need to be performed at all, according to some embodiments of the invention.

These computer-executable program instructions may be loaded onto a special purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

Many modifications and other embodiments of the invention set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method, comprising:
    identifying, by a service provider system comprising one or more computers, a plurality of data streams, wherein each data stream has a corresponding variable bit rate;
    determining, by the service provider system based upon an analysis of the corresponding variable bit rate: a subset of the plurality of data streams to be combined, wherein the subset of the data streams is determined based at least in part on a total available bandwidth for combining data streams, and a threshold bandwidth associated with at least one of the data streams, wherein determining the threshold bandwidth comprises:
        determining, by the service provider system, an average bit rate for the data stream;
        determining, by the service provider system, a standard deviation for the variable bit rate associated with the data stream; and
        determining, by the service provider system, the threshold bandwidth based at least in part on the average bit rate and the standard deviation;
    combining, by the service provider system, the subset of data streams; and
    transmitting, using a first network interface of the one or more computers, associated with the service provider system, the combined subset of data streams to a second network interface associated with each of one or more consumer devices.

2. The method of claim 1, wherein determining the subset of data streams to be combined comprises:
    identifying, by the service provider system, the total available bandwidth for combining data streams;
    determining, by the service provider system for each data stream, a respective threshold bandwidth; and
    determining, by the service provider system based at least in part on the determined respective threshold bandwidth and the total available bandwidth, the subset of data streams.

3. The method of claim 1, wherein determining the threshold bandwidth further comprises:
    determining, by the service provider system, a weighting factor associated with a desired delay for transmitting the data stream; and
    determining the threshold bandwidth based at least in part on the determined weighting factor.

4. The method of claim 2, wherein identifying the available bandwidth comprises identifying an available bandwidth associated with a plurality of bonded channels.

5. The method of claim 1, wherein determining the subset of the plurality of data streams to be combined comprises determining a subset for a predetermined time period.

6. The method of claim 1, wherein determining the subset of the plurality of data streams to be combined comprises determining a subset comprising data streams having different resolutions.

7. A system, comprising:
    at least one memory configured to store computer-executable instructions; and
    at least one processor configured to access the at least one memory and execute the computer-executable instructions to:
        identify a plurality of variable bit rate data streams;
        determine, based upon an analysis of the variable bit rates associated with the data streams:
            a subset of the data streams to be combined, wherein the subset of the data streams to be combined is determined based at least in part on a total available bandwidth for combining data streams,
            determine an average bit rate for the data streams,
            determine a standard deviation for the variable bit rate associated with the data streams,
            determine a threshold bandwidth associated with at least one of the data streams based at least in part on the average bit rate and the standard deviation;
        direct the combination of the subset of data streams; and
        direct the transmission of the combined subset of data streams using a first network interface associated with the at least one processor to a second network interface associated with each of one or more consumer devices.

8. The system of claim 7, wherein the at least one processor is configured to determine the subset of the data streams to be combined by executing the computer-executable instructions to:
identify the total available bandwidth for combining data streams;
determine, for each data stream, a respective threshold bandwidth; and
determine, based at least in part on the determined respective threshold bandwidth and the available bandwidth, the subset of data streams.

9. The system of claim 7, wherein the at least one processor is further configured to determine the threshold bandwidth based at least in part upon a weighting factor associated with a desired delay for transmitting the data stream.

10. The system of claim 8, wherein the identified available bandwidth comprises an available bandwidth associated with a plurality of bonded channels.

11. The system of claim 7, wherein the at least one processor is further configured to determine the subset of the data streams for a predetermined time period.

12. The system of claim 7, wherein the subset of the data streams to be combined comprises data streams having different resolutions.

13. A method, comprising:
identifying, by a service provider system comprising one or more computers, a data stream comprising a variable bit rate;
determining, by the service provider system, a threshold bandwidth for the data stream, wherein determining the threshold bandwidth comprises:
determining, by the service provider system, an average bit rate for the data stream;
determining, by the service provider system, a standard deviation for the variable bit rate associated with the data stream; and
determining, by the service provider system, the threshold bandwidth based at least in part on the average bit rate and the standard deviation; and
determining, by the service provider system based at least in part on the determined threshold bandwidth, whether the data stream should be added to a combined group of data streams, wherein the subset of the data streams to be added is determined based at least in part on an available bandwidth for combining data streams.

14. The method of claim 13, wherein determining whether the data stream should be added to a combined group of data streams comprises:
identifying, by the service provider system, the available bandwidth associated with the combined group of data streams; and
determining, by the service provider system, whether the threshold bandwidth exceeds the available bandwidth.

15. The method of claim 13, wherein determining the threshold bandwidth further comprises:
determining, by the service provider system, a weighting factor associated with a desired delay for transmitting the data stream; and
determining the threshold bandwidth based at least in part on the determined weighting factor.

16. The method of claim 14, wherein identifying the available bandwidth comprises identifying an available bandwidth associated with a plurality of bonded channels.

17. The method of claim 13, wherein determining whether the data stream should be added to a combined group of data streams comprises determining whether the data stream should be added for a predetermined period of time.

* * * * *